US012803403B2

(12) United States Patent
Wang

(10) Patent No.: US 12,803,403 B2
(45) Date of Patent: Nov. 17, 2026

(54) HOMOPOLAR VECTOR ROTATION MOTOR

(71) Applicant: Meng-Theng Wang, New Taipei City (TW)

(72) Inventor: Meng-Theng Wang, New Taipei City (TW)

( * ) Notice: Subject to any disclaimer, the term of this patent is extended or adjusted under 35 U.S.C. 154(b) by 196 days.

(21) Appl. No.: 18/679,371

(22) Filed: May 30, 2024

(65) Prior Publication Data

US 2025/0373135 A1 Dec. 4, 2025

(51) Int. Cl.
*H02K 21/24* (2006.01)

(52) U.S. Cl.
CPC .................................... *H02K 21/24* (2013.01)

(58) Field of Classification Search
CPC ...................................................... H02K 21/24
See application file for complete search history.

(56) References Cited

U.S. PATENT DOCUMENTS 4,358,693 A * 11/1982 Palmer .................. H02K 25/00 310/46
4,544,868 A * 10/1985 Murty .................... H02P 6/085 318/400.11

* cited by examiner

*Primary Examiner* — Tulsidas C Patel
*Assistant Examiner* — Mohammed Ahmed Qureshi
(74) *Attorney, Agent, or Firm* — Leong C. Lei

(57) ABSTRACT

A monopolar vector rotation motor includes a power supply control unit, a stator, and a rotor. Electromagnets are arranged along a circumference of a stator body of the stator and are intermittently supplied with electricity to generate electromagnetic forces. Magnets are arranged along a circumference of a rotor body of the rotor. A center axle concentrically extends through the rotor body and the stator body. The rotor body is rotatable with the center axle to have the magnets correspond to the electromagnets, where electricity is supplied to the electromagnets to generate the electromagnetic forces having magnetisms consistent with the magnets so that repelling magnetic forces drive the rotor body to continue rotating. The rotor body is rotatable to have the magnets not corresponding to the electromagnets, where electricity supplied to the electromagnets is cut off to not generate the electromagnetic force, and the rotor body continues rotating with rotational inertial.

6 Claims, 7 Drawing Sheets

HOMOPOLAR VECTOR ROTATION MOTOR

BACKGROUND OF THE INVENTION

(a) Technical Field of the Invention

The present invention relates to the field of electrical motors.

(b) Description of the Prior Art

There are various types of motors, which, in terms of essential structure, are generally made up of a stator and a rotor. The stator remains stationary in space, while the rotor rotates around an axis and is generally supported by bearings. A certain air gap is present between the stator and the rotor to ensure that the rotor can rotate freely.

Motors can be classified as DC motors and AC motors. The principle of the DC motors is that the stator does not move and the rotor moves in the direction of force induced through interaction. The AC motors are operated in such a way that an alternating current is fed to a stator winding coil to generate a rotating magnetic field, and the rotating magnetic field attracts the rotor to rotate together.

Taking a common three-phase motor as an example, a three-phase alternating current consists of three alternating currents of equal magnitude and frequency but having a phase difference of 120 degrees. Under the action of the magnetic field of the winding of the stator, according to Fleming's right hand rule, the central conductor generates an induced current, and with the change of the AC power, the magnetic poles are caused to constantly rotate. The direction of movement of a conductor in the moving magnetic field is consistent with the magnetic field and thus, the rotor rotates accordingly.

Generally, most household AC power is single-phase alternating current. As the single-phase alternating current has only one set of currents of which the magnitude and direction change over time. A magnetic field of such a current cannot be directly applied to drive the rotor. Therefore, compared to the three-phase induction motors, it has only one winding for operation, and the single-phase induction motors require an additional starting winding, and the starting winding runs, ahead of the operation winding by 90 degrees in phase in order to ensure the rotor movement.

SUMMARY OF THE INVENTION

The present invention provides a monopolar vector rotation motor, which comprises: a power supply control unit; a stator, which comprises a stator body and a plurality of electromagnets arranged at equal angle along a circumference of the stator body, the stator body being arranged in a fixed manner and penetrated by a center axle in a movable manner, the electromagnets being electrically connected with the power supply control unit; and a rotor, which comprises a rotor body and a plurality of magnets arranged at equal angle along a circumference of the rotor body, the rotor body being fixed to the center axle, wherein the rotor body is rotatable with the center axle relative to the stator body to have the magnets corresponding in position to the electromagnets, where the power supply control unit controls supply of electricity to the electromagnets to have electromagnetic forces of magnetisms consistent with the magnets induced with the electromagnets so as to apply a repelling magnetic force to drive the rotor body to continue rotating, and wherein the rotor body is rotatable relative to the stator body to have the magnets not corresponding, in position, to the electromagnets, where the power supply control unit controls interruption of the supply of electricity to the electromagnets to not induce the electromagnetic forces with the electromagnets, and the rotor body is kept continuing rotating until the magnets again correspond, in position, to the electromagnets, where the power supply control unit again controls supply of electricity to the electromagnets to induce electromagnetic forces with the electromagnets to drive the rotor body to continue rotating, this being cyclically repeated for operation. The present invention adopts intermittent supply of electricity, in combination with mutually repelling magnetic force to drive the rotor to rotate so as to reduce ½ of the electrical power consumption.

In one embodiment of the present invention, the electromagnets of the stator body are arranged such that when the electromagnets are supplied with electricity, each of the electromagnets induces, on two opposite sides thereof in a radial direction of the stator body, electromagnetic forces of opposite polarities; and wherein the magnets arranged on the rotor body comprise a plurality of first magnets arranged on a radial outer side of the rotor body and a plurality of second magnets arranged on a radial inner side of the rotor body, the first magnets and the second magnets having magnetic forces respectively repelling with respect to two opposite sides of the electromagnets. The present invention adopts the arrangement that electromagnetic forces are induced on two opposite sides of the electromagnets, and the first magnets are arranged at arranged on the radial outer side and the second magnets are arranged on the radial inner side, so as to enlarge the torque by two times and achieve consumption of electrical power by around ¼.

In one embodiment of the present invention, the rotor body is formed with an outer wall at the radial outer side thereof and an inner wall at a radial inner side thereof, the first magnets being arranged on the outer wall, the second magnets being arranged on the inner wall; and wherein a protruding wall is formed on an outer perimeter of the stator body, and the first electromagnets are arranged on an external side of the protruding wall, and the second electromagnets are arranged on an internal side of the protruding wall, the protruding wall being arranged between the outer wall and the inner wall.

In one embodiment of the present invention, the rotor body comprises a first rotor body and a second rotor body that are spaced from each other and are concentrically fixed to the center axle, an outer wall being formed on an outer perimeter of the first rotor body, an outside diameter of the second rotor body being smaller than an inside diameter of the outer wall, the first magnets being arranged on an end edge of the outer wall, the second magnets being arranged on an outer periphery of the second rotor body; and wherein the first electromagnets are arranged on an outer periphery of the stator body, and the second electromagnets are arranged on an inner periphery of the stator body, the stator body being arranged between the first rotor body and the second rotor body.

Preferably, the first magnets and the second magnets one side of each of the first magnets and the second magnets that faces the electromagnets is formed with an oblique surface, and one side of each of the first electromagnets and the second electromagnets that faces the oblique surface is formed with a planar surface. With such a structure, when the rotor is rotating relative to the stator to have the first and second magnets gradually reduce the distance to approach the electromagnets, at a shortest distance therebetween, the electromagnets repel and push the first and second magnets to drive the rotor body to rotate.

In one embodiment of the present invention, the rotor body comprises a first rotor body and a second rotor body that are spaced from each other and are respectively arranged at two opposite sides of the fixed rotor body in an axial direction and are concentrically fixed to the center axle; wherein the magnets comprise a plurality of first magnets arranged on the first rotor body and a plurality of second magnets arranged on the second rotor body; and wherein when the electromagnets are supplied with electricity, each of the electromagnets induces electromagnetic forces on two opposite sides thereof in an axial direction of the rotor body respectively, while the first magnets and the second magnets have magnetic forces that repel with respect to two opposite sides of the electromagnets, respectively.

In the above, the electromagnets are arranged as a plurality of circles at different diametric positions on the stator body; the first magnets are arranged as a plurality of circles set at different diametric positions on the first rotor body to have the first magnets corresponding to one side of the electromagnets; and the second magnets are arranged as a plurality of circles set at different diametric positions on the second rotor body to have the second magnets corresponding to an opposite side of the electromagnets.

DETAILED DESCRIPTION OF THE PREFERRED EMBODIMENTS

In the disclosure, terminologies, such as "first" and "second", used herein are adopted for distinguishing elements having identical or similar properties and are not intended to limit the sequence, the priority, and the sizes of the elements.

Embodiment 1

Figure 1:
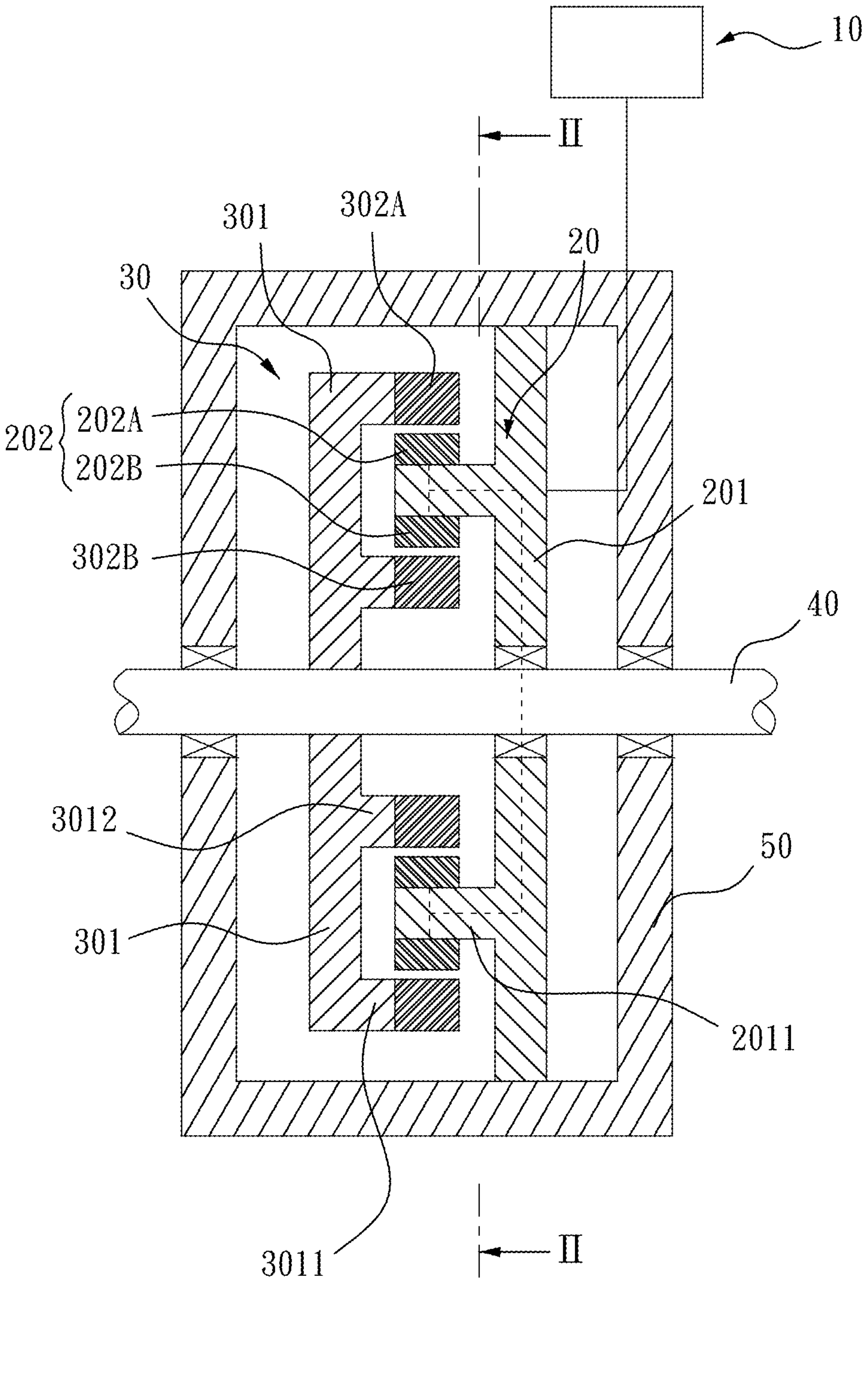
FIG. 1 is a schematic cross-sectional view showing a structure of a first embodiment of the present invention.
Figure 2:
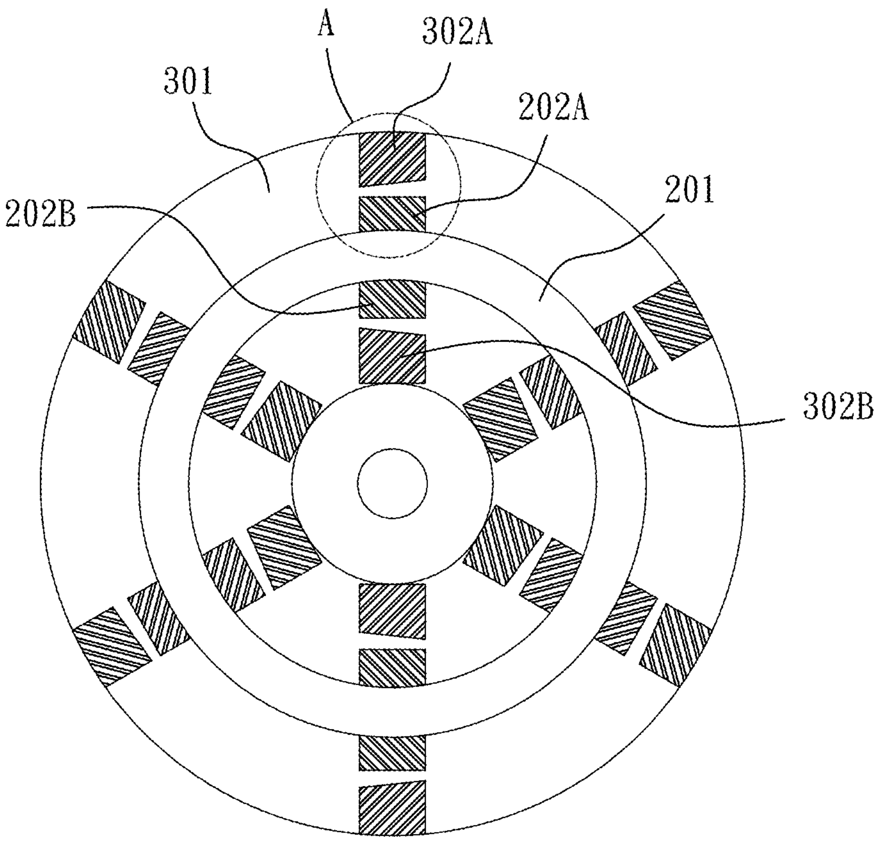
FIG. 2 is a schematic cross-sectional view taken along line II-II of FIG. 1.

As shown in FIGS. 1 and 2, the present invention provides a monopolar vector rotation motor, which comprises: a power supply control unit 10, a stator 20, and a rotor 30. The stator 20 comprises a stator body 201 in the form of a circular disk and a plurality of electromagnets 202 arranged at equal angle along a circumference of the stator body 201. The stator body 201 is fixed on the housing 50 and does not rotate and is penetrated by a center axle 40, with a bearing arranged between the center axle 40 and the stator body 201 to allow the center axle 40 to freely rotate relative to the stator body 201. The center axle 40 is mounted, through bearings, in the housing 50, so that the center axle 40 is rotatable in and relative to the housing 50, but the stator body 201 is fixed and does not rotate. The electromagnets 202 are electrically connected to the power supply control unit 10, and the power supply control unit 10 controls a direct current to intermittently supply to the electromagnets 202 to induce magnetism in the electromagnets 202. Specifically, the electromagnets 202 are arranged on the stator 20 in such a way that when the electromagnets 202 are electrified through the supply of direct current thereto from the power supply control unit 10, each of the electromagnets 202 induces, on two opposite sides thereof in a radial direction of the stator body 201, electromagnetic forces of opposite polarities.

More specifically, the electromagnets 202 may comprise a plurality of first electromagnets 202A and a plurality of second electromagnets 202B. A protruding wall 2011 is formed at one side of an outer perimeter of the stator body 20, and the first electromagnets 202A are arranged at equal angle along a circumference of an external side of the protruding wall 2011 and the second electromagnets 202B are arranged at equal angle along a circumference of an internal side of the protruding wall 2011. The first electromagnets 202A and the second electromagnets 202B are connected by conductive wires to the power supply control unit 10. The conductive wires are arranged to extend through channels (not shown in the drawings) formed in the stator body 201 to electrically connect the first electromagnets 202A and the second electromagnets 202B.

The rotor 30 comprises a rotor body 301 in the form of a circular disk. A plurality of first magnets 302A are arranged at equal angle along a circumference of a radial outer side of the rotor body 301, and a plurality of second magnets 302B are arranged at equal angle along a circumference of a radial inner side of the rotor body 301. The first magnets 302A and the second magnets 302B are respectively designated with the same magnetisms as those of the electromagnetic forces induced at the two opposite sides of the electromagnets 202. In other words, the first magnets 302A have a magnetic force that repels with respect to the electromagnetic force generated by the first electromagnets 202A, and the second magnets 302B have a magnetic force that repels the electromagnetic force generated by the second electromagnets 202B. More specifically, the rotor body 301 is formed with an outer wall 3011 at the radial outer side thereof and an inner wall 3012 at a radial inner side thereof, and the first magnets 302A are arranged on the outer wall 3011 and the second magnets 302B are arranged on the inner wall 3012. The rotor body 301 is fixed on the center axle 40, so that the rotor body 301 is rotatable with the center axle 40. Further, the rotor body 30 and the stator body 20 are arranged concentrically around a center defined by the center axle 40, and are arranged so that the protruding wall 2011 is located between the outer wall 3011 and the inner wall 3012, and a position of a locus along which the first magnets 302A circumferentially rotate corresponds to a position of a virtual circumference of the first electromagnets 202A, and a position of a locus along which the second magnets 302B circumferentially rotate corresponds to a position of a virtual circumference of the second electromagnets 202B.

Figure 3:
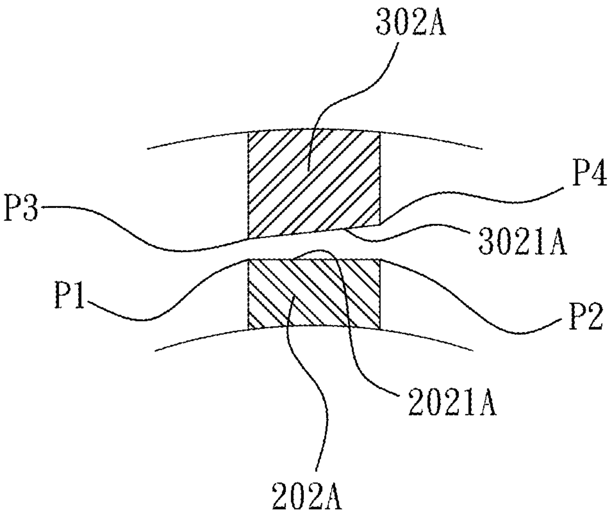
FIG. 3 is a local enlarged view of region A of FIG. 2.

As shown in FIG. 3, in a preferred embodiment of the present invention, surfaces of the first electromagnets 202A and the first magnets 302A that face each other respectively form a planar surface 2021A and an oblique surface 3021A, wherein two opposite ends of the planar surface 2021A are respectively a first point P1 and a second point P2 having equal heights, and two opposite ends of the oblique surface

Figure 4:
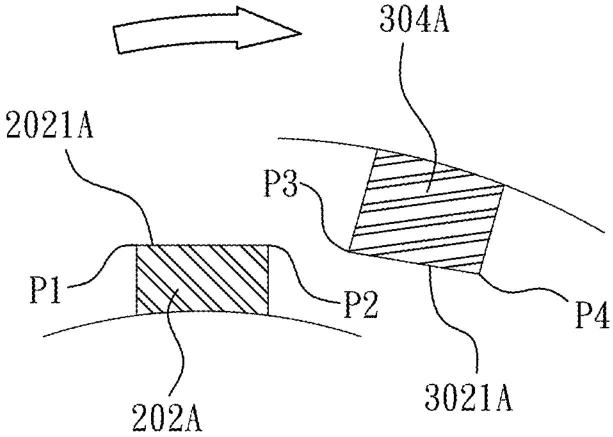
FIG. 4 is a schematic view showing a relationship demonstrating electromagnets of FIG. 3 drive a magnet to make a rotor rotating.

3021A are respectively a third point P3 and a fourth point P4 of different heights. In other words, when the planar surface 2021A and the oblique surface 3021A become facing each other, a distance between the first point P1 and the third point P3 is less than a distance between the second point P2 and the fourth point P4. Being so structurally arranged, as shown in FIG. 4, for clockwise rotation of the rotor body 301, during a course that the first magnets 302A is moving to approach the first electromagnets 202A, in a direction from the fourth point P4 toward the third point P3, the distance of the oblique surface 3021A from the first point P1 of the planar surface 2021A is gradually decreased, so that the first magnets 302A is acted on by a relatively small repellent force and can smoothly move toward a position corresponding to the first electromagnets 202A, until the distance between the third point P3 of the oblique surface 3021A and the first point P1 of the planar surface 2021A becomes minimum, where the electromagnetic force induced by the first electromagnets 202A is sufficient to repel and push the first magnets 302A to rotate in the clockwise direction (as shown in FIG. 4). In this way, the rotor body 301 is caused to continuously rotate. In a similar way, surfaces of the second electromagnets 202B and the second magnets 302B that face each other are respectively formed with a planar surface and an oblique surface, similar to what described above, and achieving the same effect as that described above, repeated description being omitted herein.

Figure 5:
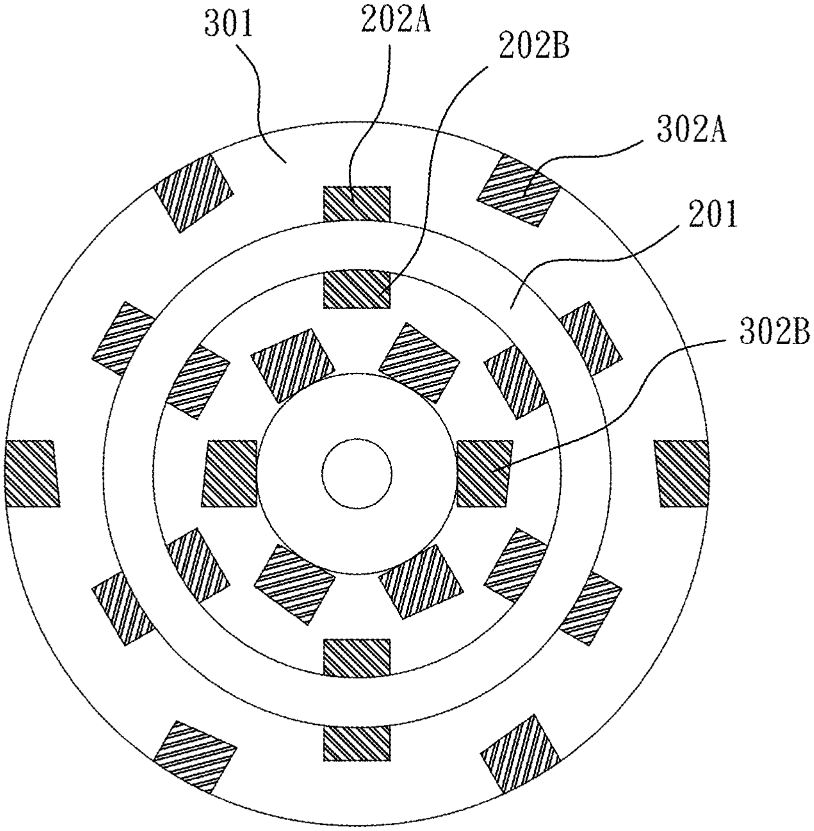
FIG. 5 is a schematic view showing a state in which first and second magnets of a rotor body shown in FIG. 1 do not correspond to the electromagnets.

The following provides an explanation of the operation of the monopolar vector rotation motor according to the present invention. In the present invention, the power supply control unit 10 supplies a direct current, in an intermittent way of power supply, to each of the electromagnets 202 to drive the rotor body 301 to rotate. More specifically, as shown in FIG. 5, when the rotor body 301 rotates with the center axle 40 relative to the stator body 201, it is only when the first magnets 302A are at positions corresponding to the first electromagnets 202A and the second magnets 302B are at positions corresponding to the second electromagnets 202B, the power supply control unit 10 controls, by means of pre-set computer programs, and supplies the direct current to the first electromagnets 202A and the second electromagnets 202B, in order to have the first electromagnets 202A and the second electromagnets 202B generating electromagnetic forces respectively consistent with the magnetisms of the first magnets 302A and the second magnets 302B to thereby induce repelling magnetic forces to drive the rotor body 301 to continue rotating. When the rotor body 301 is so rotating relative to the stator body 201 such that the first magnets 302A do not correspond in position to the first electromagnets 202A and the second magnets 302B do not correspond in position to the second electromagnets 202B, the power supply control unit 10 controls, by means of pre-set computer programs, and cuts off the supply of the direct current to the first electromagnets 202A and the second electromagnets 202B so as not to generate the electromagnetic forces, and under this condition, the rotor body 301 is kept continuing rotating by rotational inertia until the first magnets 302A and the second magnets 302B reach positions corresponding to the first electromagnets 202A and the second electromagnets 202B again, when the power supply control unit 10 again controls supply of electricity to the first electromagnets 202A and the second electromagnets 202B to induce the electromagnetic force to drive the rotor body 301 to continue rotating, and the process is cyclically repeated.

Based on the monopolar vector rotation motor according to the present invention, since the power supply control unit 10 supplies the direct current in an intermittent manner, electrical power consumption can be saved by around one half (½), and the first electromagnets 202A and the second electromagnets 202B jointly repelling and pushing the first magnets 302A and the second magnets 302B to drive the rotor body 301 to rotate provides the center axle 40 with a doubled output of torque.

Embodiment 2

Figure 6:
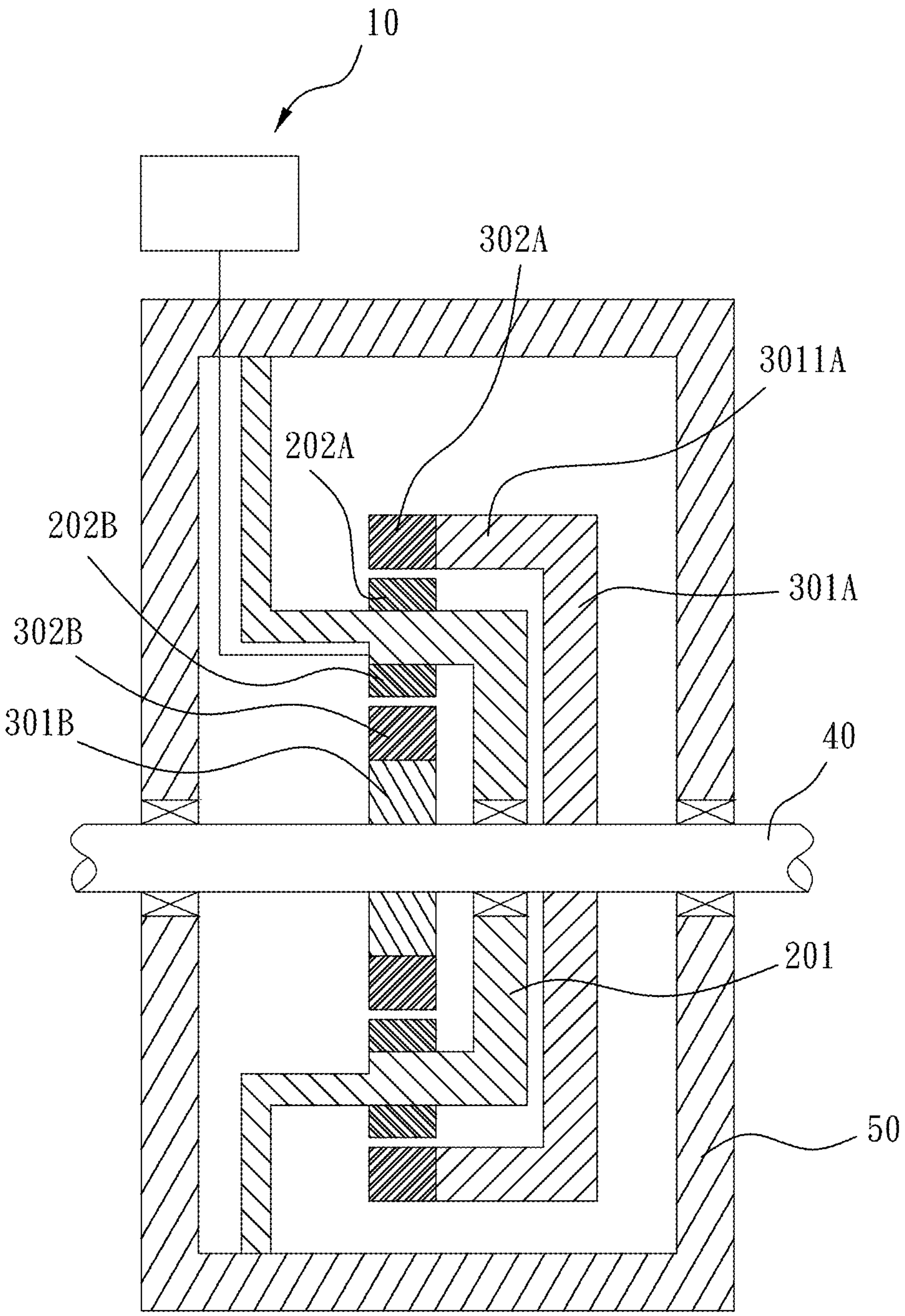
FIG. 6 is a schematic cross-sectional view showing a structure of a second embodiment of the present invention.

FIG. 6 shows a monopolar vector rotation motor according to a second embodiment of the present invention, in which a rotor body comprises a first rotor body 301A a second rotor body 301B that are spaced from each other and are concentrically fixed to a center axle 40. An outer wall 3011A is formed on an outer perimeter of the first rotor body 301A. An outside diameter of the second rotor body 301B is smaller than an inside diameter of the outer wall 3011A. A plurality of first magnets 302A are arranged on an end edge of the outer wall 3011A along a circumference, and a plurality of second magnets 302B are arranged on an outer periphery of the second rotor body 301B along a circumference. A plurality of first electromagnets 202A are arranged on an outer periphery of a stator body 201, and a plurality of second electromagnets 202B are arranged on an inner periphery. The stator body 201 is fixed to a housing 50 and is arranged between the first rotor body 301A and the second rotor body 301B, so that a position of a locus of the first magnets 302A rotating along a circumference corresponds to a position of a virtual circumference of the first electromagnets 202A, and a position of locus of the second magnets 302B rotating along a circumference corresponds to a position of a virtual circumference of the second electromagnets 202B.

Similarly, the power supply control unit 10 supplies a direct current, in an intermittent way of power supply, to each of the electromagnets to drive the rotor body 301A to rotate. In other words, when the first rotor body 301A and the second rotor body 301B rotate with the center axle 40 relative to the stator body 201, it is only when the first magnets 302A are at positions corresponding to the first electromagnets 202A and the second magnets 302B are at positions corresponding to the second electromagnets 202B, the power supply control unit 10 controls, by means of pre-set computer programs, and supplies the direct current to the first electromagnets 202A and the second electromagnets 202B, in order to have the first electromagnets 202A and the second electromagnets 202B generating electromagnetic forces respectively consistent with the magnetisms of the first magnets 302A and the second magnets 302B to thereby induce repelling magnetic forces to drive the first rotor body 301A and the second rotor body 301B to continue rotating. When the first rotor body 301A and the second rotor body 301B are so rotating relative to the stator body 201 such that the first magnets 302A do not correspond in position to the first electromagnets 202A and the second magnets 302B do not correspond in position to the second electromagnets 202B, the power supply control unit 10 controls, by means of pre-set computer programs, and cuts off the supply of the direct current to the first electromagnets 202A and the second electromagnets 202B so as not to generate the electromagnetic forces, and under this condition, the first rotor body 301A and the second rotor body 301B are kept continuing rotating by rotational inertias until the first magnets 302A and the second magnets 302B reach positions respectively corresponding to the first electromagnets 202A and the second electromagnets 202B again, when the power supply control unit 10 again controls supply of electricity to the first electromagnets 202A and the second electromagnets 202B to induce the electromagnetic force to drive the first rotor body 301A and the second rotor body 301B to continue rotating, and the process is cyclically repeated.

Embodiment 3

Figure 7:
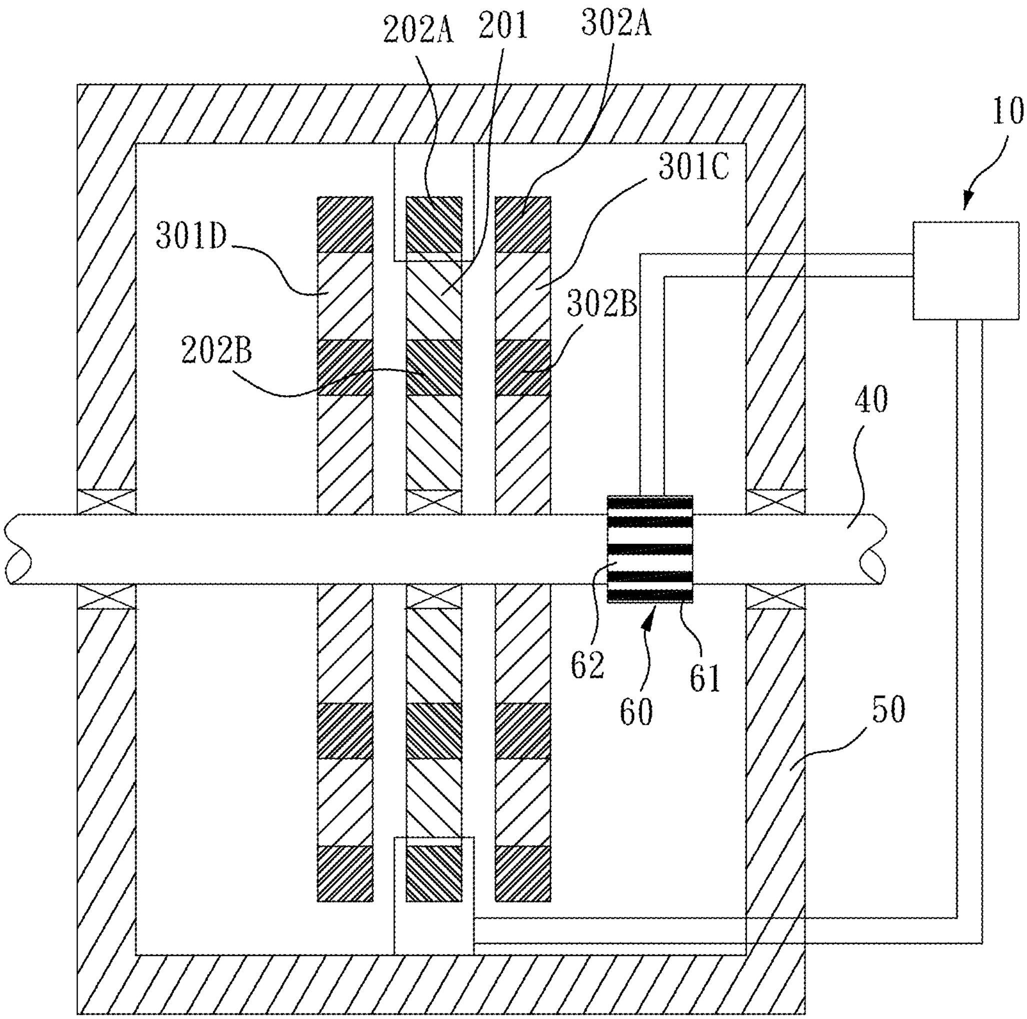
FIG. 7 is a schematic cross-sectional view showing a structure of a third embodiment of the present invention.
Figure 8:
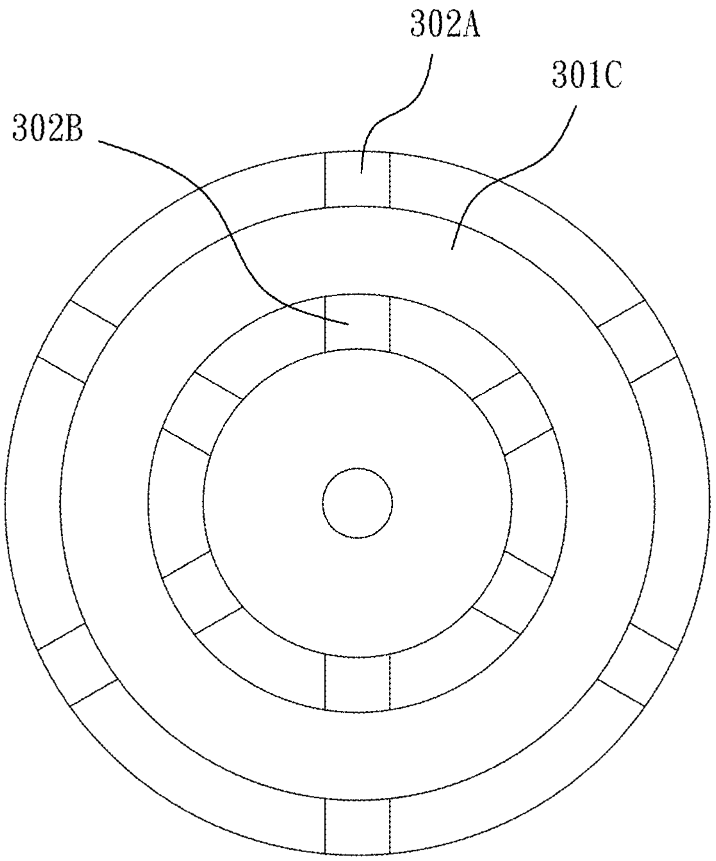
FIG. 8 is a schematic cross-sectional view taken at an axial end face of a rotor of FIG. 7.

FIGS. 7 and 8 show a monopolar vector rotation motor according to a third embodiment of the present invention, in which a rotor body comprises a first rotor body 301C and a second rotor body 301D that are spaced from each other and are respectively arranged at two opposite sides of a fixed rotor body 201 in an axial direction of the center axle 40 and are concentrically fixed to the center axle 40; a plurality of circularly-arranged first magnets 302A and a plurality of circularly-arranged second magnets 302B are set at different diametric positions of each of the first rotor body 301C and the second rotor body 301D; and a plurality of circularly-arranged first electromagnets 202A and a plurality of circularly-arranged second electromagnets 202B are respectively set at different diametric positions of the stator body 201, such that the first magnets 302A that are located on the first rotor body 301C and the second rotor body 201D respectively correspond to two opposite sides of the first electromagnets 202A, and also, the second magnets 302B respectively correspond to two opposite sides of the second electromagnets 202B. Further, the center axle 40 is provided with an electrically conductive rotor 60. A circumferential surface of the electrically conductive rotor 60 is provided with a plurality of conducting portions 61 that are arranged at fixed intervals, and an insulation portion 62 is arranged between every adjacent ones of the conducting portions 61, and an included angle between adjacent ones of the conducting portions 61 is equal to an included angle between adjacent ones of the first magnets 302A or an included angle between adjacent ones of the second magnets 302. The conducting portions 61 are electrically connected, by means of conductive wires, to each of the first electromagnets 202A and the second electromagnets 202B. The power supply control unit 10 is connected with a power supply cable, and the power supply cable is provided with an electrically conductive bar, the electrically conductive bar being set in contact engagement with the circumferential surface of the electrically conductive rotor 60.

Based on the third embodiment, when the first rotor body 301C and the second rotor body 301D rotate with the center axle 40, the electrically conductive rotor 60 rotates in synchronization therewith. When the first rotor body 301C and the second rotor body 301D reach such a position that the first magnets 302A and the second magnets 203B respectively correspond to the first electromagnets 202A and the second electromagnets 202B, the electrically conductive bar is brought into contact with the conducting portions 61 of the electrically conductive rotor 60, so as to allow the power supply control unit 10 to supply a direct current through the conducting portions 61 to the first electromagnets 202A and the second electromagnets 202B to induce, on two opposite sides in the axial direction, respectively, electromagnetic forces having opposite polarities with the first electromagnets 202A and the second electromagnets 202B. The first magnets 302A and the second magnets 302B provide magnetic forces repelling with respect to two sides of the first electromagnets 202A and the second electromagnets 202B, respectively, so as to drive the first rotor body 301C and the second rotor body 301D to rotate to thereby make torque output with the center axle 40.

I claim:

1. A monopolar vector rotation motor, comprising:

a power supply control unit;

a stator, which comprises a stator body and a plurality of electromagnets arranged at equal angle along a circumference of the stator body, the stator body being arranged in a fixed manner and penetrated by a center axle in a movable manner, the electromagnets being electrically connected with the power supply control unit; and a rotor, which comprises a rotor body and a plurality of magnets arranged at equal angle along a circumference of the rotor body, the rotor body being fixed to the center axle, wherein the rotor body is rotatable with the center axle relative to the stator body to have the magnets corresponding in position to the electromagnets, where the power supply control unit controls supply of electricity to the electromagnets to have electromagnetic forces of magnetisms consistent with the magnets induced with the electromagnets so as to apply a repelling magnetic force to drive the rotor body to continue rotating, and wherein the rotor body is rotatable relative to the stator body to have the magnets not corresponding, in position, to the electromagnets, where the power supply control unit controls interruption of the supply of electricity to the electromagnets to not induce the electromagnetic forces with the electromagnets, and the rotor body is kept continuing rotating until the magnets again correspond, in position, to the electromagnets, where the power supply control unit again controls supply of electricity to the electromagnets to induce electromagnetic forces with the electromagnets to drive the rotor body to continue rotating, this being cyclically repeated for operation, wherein when the electromagnets are supplied with electricity, each of the electromagnets induces, on two opposite sides thereof in a radial direction of the stator body, electromagnetic forces of opposite polarities; and wherein the magnets arranged on the rotor body comprise a plurality of first magnets arranged on a radial outer side of the rotor body and defining a circle having a first radius relative to the center axle and a plurality of second magnets arranged on a radial inner side of the rotor body and defining a circle having a second radius relative to the center axle, the first radius being larger than the second radius, the first magnets and the second magnets having magnetic forces respectively repelling with respect to two opposite sides of the electromagnets.

2. The monopolar vector rotation motor according to claim 1, wherein the rotor body is formed with an outer wall at the radial outer side thereof and an inner wall at a radial inner side thereof, the first magnets being arranged on the outer wall, the second magnets being arranged on the inner wall; and wherein a protruding wall is formed on an outer perimeter of the stator body, and the first electromagnets are arranged on an external side of the protruding wall, and the second electromagnets are arranged on an internal side of the protruding wall, the protruding wall being arranged between the outer wall and the inner wall.

3. The monopolar vector rotation motor according to claim 1, wherein the rotor body comprises a first rotor body and a second rotor body that are spaced from each other and are concentrically fixed to the center axle, an outer wall being formed on an outer perimeter of the first rotor body, an outside diameter of the second rotor body being smaller than an inside diameter of the outer wall, the first magnets being arranged on an end edge of the outer wall, the second magnets being arranged on an outer periphery of the second rotor body; and wherein the first electromagnets are arranged on an outer periphery of the stator body, and the second electromagnets are arranged on an inner periphery of the stator body, the stator body being arranged between the first rotor body and the second rotor body.

4. The monopolar vector rotation motor according to claim 2, wherein one side of each of the first magnets and the second magnets that faces the electromagnets is formed with an oblique surface, and one side of each of the first electromagnets and the second electromagnets that faces the oblique surface is formed with a planar surface, wherein the first and second magnets are rotatable relative to the first and second electromagnets in a predetermined rotation direction, and wherein the planar surface is defined between first and second end points and the oblique surface is defined between third and fourth end points, wherein the oblique surface and the planar surface are arranged such that when the planar surface and the oblique surface face each other, the first end point is in alignment with the third end point radially and the second end point is in alignment with the fourth end point radially, wherein a first radial distance between the first end point and the third end point is less than a second radial distance between the second end point and the fourth end point, the second radial distance between the second end point and the fourth end point being measured on a downstream side with respect to the first radial distance between the first end point and the third end point in the predetermined rotation direction.

5. The monopolar vector rotation motor according to claim 3, wherein one side of each of the first magnets and the second magnets that faces the electromagnets is formed with an oblique surface, and one side of each of the first electromagnets and the second electromagnets that faces the oblique surface is formed with a planar surface, wherein the first and second magnets are rotatable relative to the first and second electromagnets in a predetermined rotation direction, and wherein the planar surface is defined between first and second end points and the oblique surface is defined between third and fourth end points, wherein the oblique surface and the planar surface are arranged such that when the planar surface and the oblique surface face each other, the first end point is in alignment with the third end point radially and the second end point is in alignment with the fourth end point radially, wherein a first radial distance between the first end point and the third end point is less than a second radial distance between the second end point and the fourth end point, the second radial distance between the second end point and the fourth end point being measured on a downstream side with respect to the first radial distance between the first end point and the third end point in the predetermined rotation direction.

6. A monopolar vector rotation motor, comprising:

a power supply control unit;

a stator, which comprises a stator body and a plurality of electromagnets arranged at equal angle along a circumference of the stator body, the stator body being arranged in a fixed manner and penetrated by a center axle in a movable manner, the electromagnets being electrically connected with the power supply control unit; and a rotor, which comprises a rotor body and a plurality of magnets arranged at equal angle along a circumference of the rotor body, the rotor body being fixed to the center axle, wherein the rotor body is rotatable with the center axle relative to the stator body to have the magnets corresponding in position to the electromagnets, where the power supply control unit controls supply of electricity to the electromagnets to have electromagnetic forces of magnetisms consistent with the magnets induced with the electromagnets so as to apply a repelling magnetic force to drive the rotor body to continue rotating, and wherein the rotor body is rotatable relative to the stator body to have the magnets not corresponding, in position, to the electromagnets, where the power supply control unit controls interruption of the supply of electricity to the electromagnets to not induce the electromagnetic forces with the electromagnets, and the rotor body is kept continuing rotating until the magnets again correspond, in position, to the electromagnets, where the power supply control unit again controls supply of electricity to the electromagnets to induce electromagnetic forces with the electromagnets to drive the rotor body to continue rotating, this being cyclically repeated for operation;

wherein the rotor body comprises a first rotor body and a second rotor body that are spaced from each other and are respectively arranged at two opposite sides of the fixed rotor body in an axial direction and are concentrically fixed to the center axle;

wherein the magnets comprise a plurality of first magnets arranged on the first rotor body and a plurality of second magnets arranged on the second rotor body; and wherein when the electromagnets are supplied with electricity, each of the electromagnets induces electromagnetic forces on two opposite sides thereof in an axial direction of the rotor body respectively, the electromagnets being arranged as a plurality of circles at different diametric positions on the stator body;

the first magnets are arranged as a plurality of circles set at different diametric positions on the first rotor body to have the first magnets corresponding to one side of the electromagnets; and the second magnets are arranged as a plurality of circles set at different diametric positions on the second rotor body to have the second magnets corresponding to an opposite side of the electromagnets.

* * * * *